United States Patent
Youn

(10) Patent No.: US 9,436,223 B2
(45) Date of Patent: Sep. 6, 2016

(54) DISPLAY DEVICE HAVING COVER GLASS SUBSTRATE

(71) Applicant: LG Display Co., Ltd., Seoul (KR)

(72) Inventor: NamKook Youn, Seoul (KR)

(73) Assignee: LG Display Co., Ltd., Seoul (KR)

( * ) Notice: Subject to any disclaimer, the term of this patent is extended or adjusted under 35 U.S.C. 154(b) by 60 days.

(21) Appl. No.: 14/498,078

(22) Filed: Sep. 26, 2014

(65) Prior Publication Data

US 2015/0092122 A1 Apr. 2, 2015

(30) Foreign Application Priority Data

Sep. 27, 2013 (KR) ........................ 10-2013-0115561

(51) Int. Cl.
| | |
|---|---|
| *G02F 1/1333* | (2006.01) |
| *G06F 1/16* | (2006.01) |
| *G02B 5/20* | (2006.01) |
| *G02B 27/22* | (2006.01) |
| *G06F 3/01* | (2006.01) |

(52) U.S. Cl.
CPC ............. *G06F 1/1637* (2013.01); *G02B 5/201* (2013.01); *G02B 27/2214* (2013.01); *G02F 1/13338* (2013.01); *G06F 1/1643* (2013.01); *G06F 3/01* (2013.01); *G02F 2202/28* (2013.01)

(58) Field of Classification Search
CPC ........................ G02F 2202/28; G02F 1/13338
See application file for complete search history.

(56) References Cited

U.S. PATENT DOCUMENTS

| | | | |
|---|---|---|---|
| 2007/0058127 A1* | 3/2007 | Mather | G02B 27/2214 349/159 |
| 2009/0186552 A1* | 7/2009 | Shinya | G02F 1/133502 445/58 |
| 2010/0321621 A1* | 12/2010 | Kikuchi | G06F 3/044 349/122 |

* cited by examiner

*Primary Examiner* — Richard Kim
*Assistant Examiner* — Kendrick Hsu
(74) *Attorney, Agent, or Firm* — Fenwick & West LLP

(57) ABSTRACT

A display device includes: a display panel configured for displaying an image; at least one panel attached to the display panel; an adhesive layer formed between the display panel and the at least one panel and configured to attach the at least one panel to the display panel; a plurality of print layers formed on an outer circumferential surface of the at least one panel to block light transmitted through the adhesive layer; and a plurality of bubble outlets formed in at least one of the plurality of print layers to discharge bubbles included in the adhesive layer.

15 Claims, 4 Drawing Sheets

DISPLAY DEVICE HAVING COVER GLASS SUBSTRATE

CROSS-REFERENCE TO RELATED APPLICATION

Pursuant to 35 U.S.C. §119(a), this application claims the benefit of earlier filing date and right of priority to Korean Application No. 10-2013-0115561, filed on Sep. 27, 2013, the contents of which are incorporated by reference herein in its entirety.

BACKGROUND OF THE INVENTION

1. Field of the Invention

The present disclosure relates to a display device, and more particularly, to a display device in which defects resulting from attaching a functional panel to the display device are eliminated by removing bubbles generated in a transparent resin adhesive layer when a cover glass substrate is attached.

2. Background of the Invention

Flat panel display devices that are light, thin, short, and small are advantageous for use in various portable electronic devices such as mobile phones, personal digital assistants (PDAs), or notebook computers, and counterpart electronic devices. Liquid crystal displays (LCDs), plasma display panels (PDPs), field emission displays (FEDs), vacuum fluorescent displays (VFDs), and the like are different types of flat panel display devices.

Flat panel display devices are used in portable electronic devices such as mobile phones, tablet personal computers (PCs), and the like, and are used in display devices of large electronic devices such as TVs. In order to prevent damage to display devices from external impact, or the like, a hardened glass substrate is attached to a front surface of a display panel.

A cover glass substrate is attached by an adhesive formed of a transparent resin, or the like. However, when bubbles are present in a resin adhesive applied to attach the cover glass substrate to a display panel, adhesive strength between the display panel and the cover glass substrate is degraded and a path of light transmitted through the resin adhesive is changed, which causes a color shifting defect. In addition, the bubbles may include a foreign object, which may stain or scratch a screen of the display panel.

Also, in general, personal computers, portable communication devices, any other personally dedicated information processing devices, and the like, have a user interface controlled using various input devices such as a keyboard, a mouse, a touch screen, and the like. However, as portable electronic devices have developed, it is not practical to input information to portable electronic devices with input devices such as a keyboard, a mouse, and the like. Accordingly, display devices including a touch panel attached to a liquid crystal panel have been proposed to allow users to input information by directly contacting a screen with fingers, pens, or the like.

Also, display devices have been produced that provide holographic-type realistic three-dimensional (3D) stereoscopic images, allowing users to view, feel, and enjoy realistic and stereoscopic images rather than simple 2D images. Such stereoscopic image display devices include a parallax barrier or a 3D film patterned retarder (FPR) attached on a front surface of a display panel to separate images displayed on the display panel into a left-eye image and a right-eye image and to deliver different images to the left eye and to the right eye of users, thus displaying stereoscopic images.

In this manner, flat panel display panels include various functional panels such as a touch panel, a parallax barrier, a 3D FPR, or the like, attached to a front surface thereof so as to be used as display devices supporting various functions. Here, however, functional panels are attached to display panels through a transparent resin, or the like, causing a degradation of adhesive strength, color shifting due to a change in a light path, a defect due to a foreign object, and the like, like the case of attachment of a cover glass substrate.

SUMMARY OF THE INVENTION

Therefore, an aspect of the detailed description is to provide a display device in which a bubble outlet for discharging bubbles is provided in a print layer blocking light transmission to thus easily discharge bubbles included in an adhesive layer.

To achieve these and other advantages and in accordance with the purpose of this specification, as embodied and broadly described herein, a display device may include: a display panel configured to implement an image; at least one panel attached to the display panel by means of an adhesive; an adhesive layer formed between the display panel and the at least one panel and configured to attach the at least one panel to the display panel; a plurality of print layers formed on an outer circumferential surface of the at least one panel; and a plurality of bubble outlets formed in at least one of the plurality of print layers to discharge bubbles included in the adhesive layer.

The plurality of print layers may include a first print layer formed on an outer circumference of the at least one panel; and a second print layer formed on an outer circumference of the at least one panel on the first print layer. The plurality of bubble outlets may be formed in the second print layer in a width direction to discharge bubbles included in the adhesive layer on the first print layer.

The plurality of print layers may be formed of a black resin or a color resin, and the adhesive layer may be formed of an optically clear resin (OCR) or an optically clear adhesive (OCA).

According to an embodiment of the present disclosure, a bubble outlet for discharging bubbles is provided in a print layer blocking light transmission through an outer region of a display device to easily discharge bubbles included in an adhesive layer. Thus, a defect caused by the generation of bubbles may be prevented, a time duration for a deaerating process may be shortened, and a component is prevented from being affected by pressure during a deaerating process.

Further scope of applicability of the present application will become more apparent from the detailed description given hereinafter. However, it should be understood that the detailed description and specific examples, while indicating preferred embodiments of the present disclosure, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the present disclosure and are incorporated in and constitute a part of this specification, illustrate embodiments and together with the description serve to explain the principles of the present disclosure. In the drawings.

DETAILED DESCRIPTION

Description will now be given in detail of the embodiments, with reference to the accompanying drawings. For the sake of brief description with reference to the drawings, the same or equivalent components will be provided with the same reference numbers, and description thereof will not be repeated.

Figure 1:
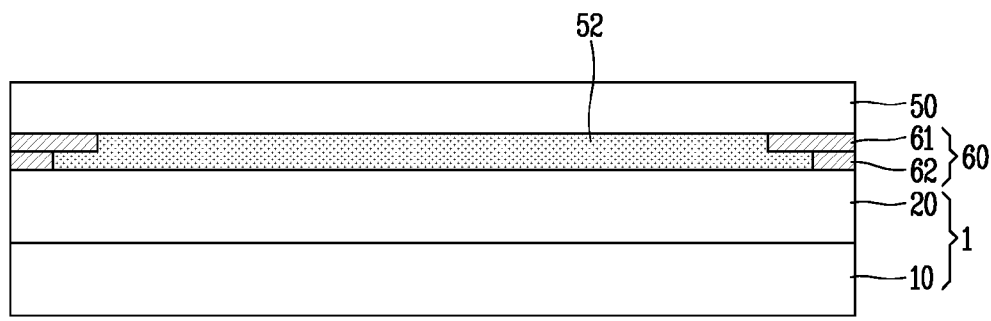
FIG. 1 is a cross-sectional view illustrating a structure of a display device according to an embodiment of the present disclosure.

FIG. 1 is a cross-sectional view illustrating a structure of a display device according to an embodiment of the present disclosure.

As illustrated in FIG. 1, a display device may include a display panel 1 displaying an image and a cover glass substrate 50 attached to the display panel 1. The cover glass substrate 50 may be attached to the display panel 1 by a transparent resin adhesive such as an optically clear resin (OCR) or an optically clear adhesive (OCA). A print layer 60 is formed in an outer region along the four sides of the cover glass substrate 50, and an adhesive layer 52 formed of a transparent resin adhesive is positioned on the cover glass substrate 50 surrounded by the print layer 60.

The display panel 1 is a flat panel display panel and various display panels such as a liquid crystal display panel, an organic light emitting display panel, and the like, may be used as the display panel 1. Although not shown, in a case in which the display panel 1 is a liquid crystal display panel, a plurality of gate lines and a plurality of data lines are formed on a first substrate 10 to define a plurality of pixel regions. A thin film transistor (TFT), a switching element, is formed in each pixel region, and a pixel electrode is formed on the pixel region. The TFT includes a gate electrode connected to a gate line, a semiconductor layer stacked on the gate electrode and formed of an amorphous silicon, and source and drain electrodes formed on the semiconductor layer and connected to a data line and the pixel electrode.

A second substrate 20 includes color filters composed of a plurality of sub-color filters implementing red, green, and blue colors and black matrices demarcating the sub-color filters and blocking light transmitted through a liquid crystal layer.

The first substrate 10 and the second substrate 20 configured as described above are attached by a sealant (not shown) formed in an outer region of an image display region in a facing manner to constitute a liquid crystal panel.

Although not shown, in a case in which the display panel 1 is a liquid crystal display panel, a first polarizer and a second polarizer may be attached to upper and lower surfaces (or front and rear surfaces) of the liquid crystal panel to change a polarization state of light input to or output from the liquid crystal panel.

In a case in which the display panel 1 is an organic light emitting display panel, an organic light emitting layer may be formed in the first substrate 10 or the second substrate 20, and thus, when a signal is input, light is emitted from the organic light emitting layer to display an image. In this case, unlike a transmissive liquid crystal display panel, the organic light emitting display panel is a self-luminous display panel, so a polarizer is not attached to the display panel 1.

Various display panels such as a plasma flat panel display panel, an electrophoretic display panel, and the like, may be used for the display panel 1.

The cover glass substrate 50 may be disposed on a front surface of the display panel 1 to protect the display panel 1 when impact is applied from the outside. Transparent plastic, or the like, may be used instead of glass for the cover glass substrate 50.

The print layer 60 is formed along the circumference of the cover glass substrate 50 in an outer region of the cover glass substrate 50. The print layer 60 blocks light transmission through the outer region of the cover glass substrate 50 when the cover glass substrate 50 is attached, thus preventing light leakage to the region to prevent a degradation of image quality.

Figure 2:
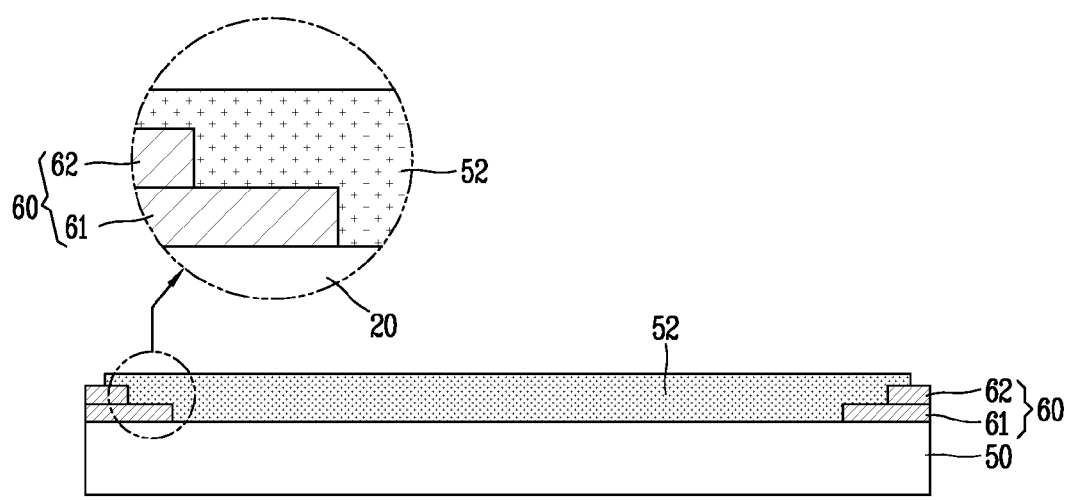
FIG. 2 is a cross-sectional view illustrating a cover glass substrate including an adhesive layer in the display device according to an embodiment of the present disclosure.

FIG. 2 is a view illustrating the cover glass substrate 50 on which the print layer 60 is formed and the adhesive layer 52 is coated.

As illustrated in FIG. 2, the print layer 60 may include a first print layer 61 and a second print layer 62 formed on the first print layer 61. In this case, the first print layer 61 is formed to have a first width, and the second print layer 62 is formed to have a second width smaller than the first width on the first print layer 61, exposing a partial region of the first print layer 61. Thus, the transparent resin adhesive of the adhesive layer 52 is coated onto the exposed region.

The print layer 60 may be formed as a dual-layer composed of the first print layer 61 and the second print layer 62 or may include a plurality of layers, and the reason for this is as follows.

If the print layer 60 is thin, when the cover glass substrate 50 is attached to the display panel 1, a partial amount of light is transmitted through the print layer 60, and thus, the corresponding region is not fully blocked. If the print layer 60 is formed through a single process such that light cannot be transmitted therethrough, it is difficult to form the print layer 60 to have a uniform thickness.

Thus, in the illustrated embodiment, the print layer 60 having a predetermined thickness is formed from plurality of layers, thereby enhancing a light blocking effect and forming a print layer 60 having a uniform thickness.

The first print layer 61 and the second print layer 62 are formed of a black resin to completely block light in the outer region, but the first print layer 61 and the second print layer 62 may be formed of a colored resin. When the first print layer 61 and the second print layer 62 are formed of a resin of a particular color, a frame effect of displaying a desired color in an edge region of a display device may be obtained.

Figure 3A:
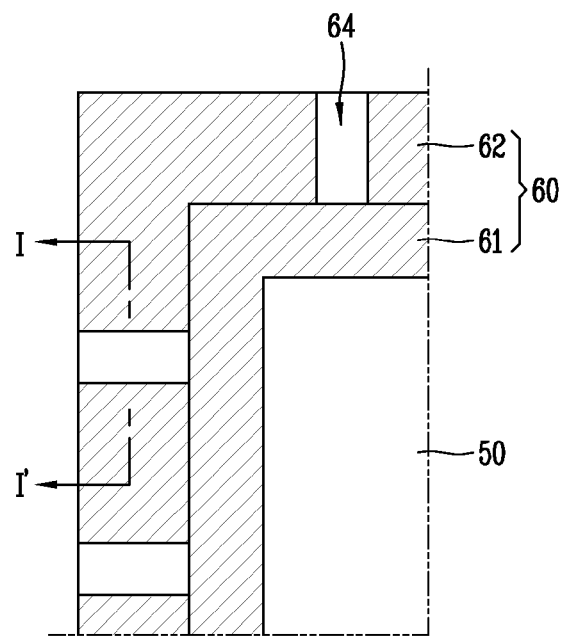
FIG. 3A is a partial plan view illustrating a print layer including an air outlet.

As illustrated in FIG. 3A, a plurality of bubble outlets 64 are formed in the second print layer 62. A plurality of bubble outlets 64 are formed along the width of the second print layer 62 with entrances facing the center of the cover glass substrate 50 and exits facing the exterior of the cover glass substrate 50, whereby bubbles generated in the adhesive layer 52 are discharged outward through the bubble outlets 64 when a transparent resin adhesive is applied.

Figure 3B:
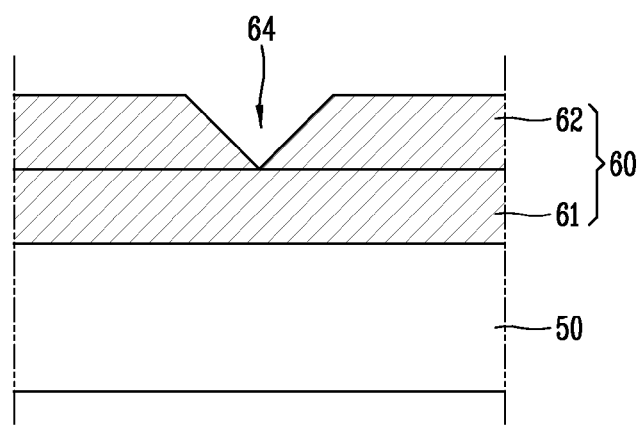
FIG. 3B is a cross-sectional view taken along line I-I' of FIG. 3A.

As illustrated in FIG. 3B, the bubble outlet 64 is formed by cutting away a portion of the second print layer 62. In the drawing, a cross-section of the bubble outlet 64 is formed to have a V-shape, but the cross-section of the bubble outlet 64 may have various other shapes such as a U-shape or a quadrangular shape.

As described above, in the present disclosure, the bubble outlet 64 is formed in the second print layer 62, and here, the reason for forming the bubble outlet 64 will be described in detail.

Figure 4A:
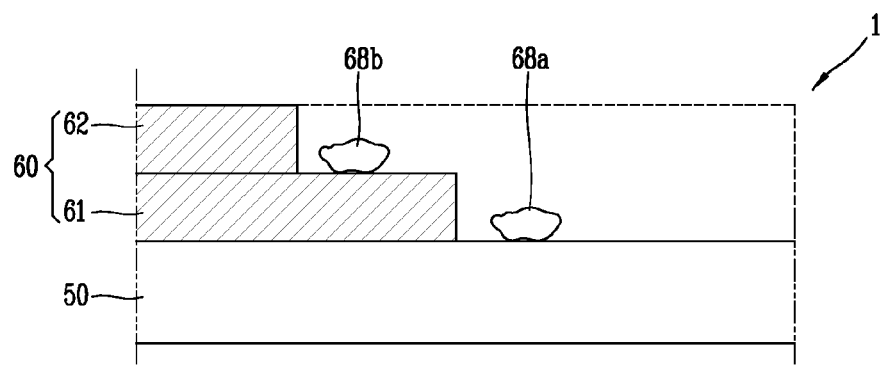
FIGS. 4A and 4B are views illustrating discharging of bubbles included in the adhesive layer of the display device according to an embodiment of the present disclosure.
Figure 4B:
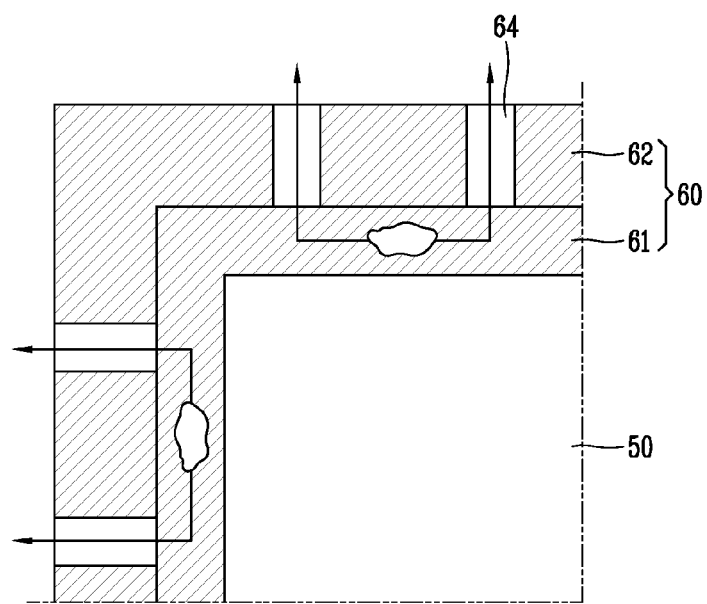

FIGS. 4A and 4B are a partial cross-sectional view and a partially enlarged view of the cover glass substrate 50 on which a print layer 60 is formed, respectively.

As illustrated in FIGS. 4A and 4B, the first print layer 61 is formed along the outer region of the cover glass substrate 50, and the second print layer 62 having a width smaller than that of the first print layer 61 is formed on the first print layer 61. Thus, a step is formed in the first print layer 61 and the second print layer 62 toward a central region of the cover glass substrate 50.

When a transparent resin adhesive is applied to an upper surface of the cover glass substrate 50, the resin adhesive may also be applied even to the step of the print layer 60, namely, even to a partial region of the first print layer 61. In this case, a bubble 68a is formed on the cover glass substrate 50 in the vicinity of the first layer 61 due to the step by the first print layer 61, namely, due to a step between the first print layer 61 and the cover glass substrate 50, and a bubble 68b is generated on the first print layer 61 due to a step generated by the first print layer 61 and the second print layer 62.

The bubbles 68a and 68b may weaken adhesive strength of the adhesive layer 52 and change a path of light when an image of the display panel 1 is displayed through the cover glass substrate 50, causing a defect of shifting a color when an image is displayed. Also, since the bubbles 68a and 68b may include a foreign object, a smudge or a scratch may be generated on the screen due to the foreign object.

Thus, in order to remove the bubbles 68a and 68b, a deaerating process is performed. Namely, after the transparent resin adhesive is applied to the cover glass substrate 50, the cover glass substrate 50 with the resin adhesive applied thereto is disposed for a predetermined period of time in a chamber in a decompressed or pressurized state, or the cover glass substrate 50 with the resin adhesive applied thereto is left for a predetermined period of time in the air. Through the deaerating process, the bubbles 68a and 68b included in the adhesive layer 52 are removed.

During the deaerating process, an operator may recognize a bubble removed state with his or her naked eyes and determine whether to continue the deaerating process or whether to stop the deaerating process. Since the bubble 68a present in the cover glass substrate 50 may be checked by the naked eyes of the operator, the deaerating process may be performed until the bubble 68a is removed.

However, in the case of the bubble 68b generated on the first print layer 61, the operator cannot determine whether the bubble exists due to the print layer 61 being formed of a black resin, or the like. Thus, during a general deaerating process, when the bubble 68a on the cover glass substrate 50 is removed, it is determined that the bubble 68b on the first print layer 61 has also been removed, and the deaerating process is terminated, or after the bubble 68a on the cover glass substrate 50 is removed, the deaerating process is performed during a predetermined period of time to thus remove the bubble 68b on the first print layer 61 as possible.

However, in a case in which the deaerating process is terminated when the bubble 68a on the cover glass substrate 50 has been removed, if the bubble 68b on the first print layer 61 has not been completely removed, a defect such as a degradation of adhesive strength and color shifting continues to occur.

Also, in the case in which the deaerating process is performed for a predetermined period of time after the bubble 68a on the cover glass substrate 50 is removed, the delay introduced by this process increases manufacturing costs, and in the case in which the deaerating process is performed in a decompressed or pressurized state, impact is continuously applied to the component due to the long-time pressure application.

In the illustrated embodiment, the bubble outlet 64 is formed in the second print layer 62 to address the foregoing problem. As illustrated in FIG. 4B, when external pressure is reduced or the cover glass substrate 50 is left for a predetermined period of time during the deaerating process, the bubble 68b present on the first print layer 61 may be discharged through the bubble outlet 64.

Since the bubble 68b present on the first print layer 61 is discharged through the bubble outlet 64 and the bubble 68a on the cover glass substrate 50 is discharged outwardly without passing through the bubble outlet 64 during the deaerating process, the bubble 68b is discharged through the bubble outlet 64 earlier than the bubble 68a, which is discharged without passing through the bubble outlet 64. Thus, when the bubble 68a on the cover glass substrate 50 is removed during the deaerating process, it may mean that the bubble 68b present on the first print layer 61 has also been already removed. Thus, when the operator determines that the bubble 68a on the cover glass substrate 50 has been removed, and terminates the deaerating process, the bubble 68b present on the first print layer 61 may also be removed.

In other words, the operator may determine whether to continue or to terminate the deaerating process upon determining whether the bubble 68a is present on the cover glass substrate 50, regardless of the bubble 68b on the first print layer 61.

In this case, if a number of bubbles 68b on the first layer 61 is far greater than that of bubbles 68a on the cover glass substrate 50, even though the discharge speed of the bubbles 68b on the first layer 61 is faster, the bubbles 68b on the first print layer 61 may not be completely removed during the deaerating process. However, in general, it is determined that the number of bubbles generated on the cover glass substrate 50 and the number of bubbles generated in the adhesive layer 52 on the print layer 61 are not significantly different, and thus, the deaerating process may be terminated according to whether the bubble 68a on the cover glass substrate 50 has been removed.

A plurality of bubble outlets 64 may be formed at predetermined intervals on the first print layer 61 formed along the circumference of the cover glass substrate 50. A width of each of the bubble outlets 64 and a distance between the bubble outlets 64 may be designed depending on a width, a thickness, and the like, of the first print layer 61.

Meanwhile, a transparent resin adhesive is not discharged outwardly through the bubble outlet 64. The bubble outlet 64 is a hole allowing air to be discharged therethrough, which is formed to be very fine, and thus, it is not formed large enough to allow a resin molecule to be discharged therethrough. In addition, since the resin adhesive has a high degree of viscosity, the adhesive cannot be discharged through the bubble outlet 64 and only the bubble 68b included in the resin adhesive is discharged.

As described above, in the illustrated embodiment, since the plurality of bubble outlets 64 are formed in the second print layer 62, the bubble 68b generated in the first print layer 61 may be easily discharged during a deaerating process.

Meanwhile, in the drawing, the print layer 60 is formed as a dual-layer and the bubble outlets 64 are formed in the upper layer thereof. However, the print layer 60 may include three or more layers and bubble outlets 64 may be formed in one or more layers thereof Another reason for forming the print layer 60 to include the first print layer 61 and the second print layer 62 is to form the bubble outlets 64 in the second layer 62. The print layer 60 may be formed to have a thickness sufficient for blocking light completely through a single process.

In the case of forming the print layer 60 through a single process, a step may be formed in the print layer 60. Here, in order to form bubble outlets 64 in the print layer 60 formed through a single process, bubble outlets 64 are formed across the entire print layer 60. Thus, it is difficult to form bubble outlets 64 and it is substantially impossible to accurately align the entrances of bubble outlets 64 with the step where bubbles are generated.

Thus, in the illustrated embodiment, the print layer 60 is formed as a plurality of layers and a bubble outlet 64 is formed in each of the layers (for example, in the second print layer 62), whereby bubbles generated in steps respectively due to the layers may be easily removed.

Meanwhile, the present disclosure may be applied to display devices having various structures, rather than being limited only to the display device including the display panel 1 and the cover glass substrate 50 as described above.

Figure 5:
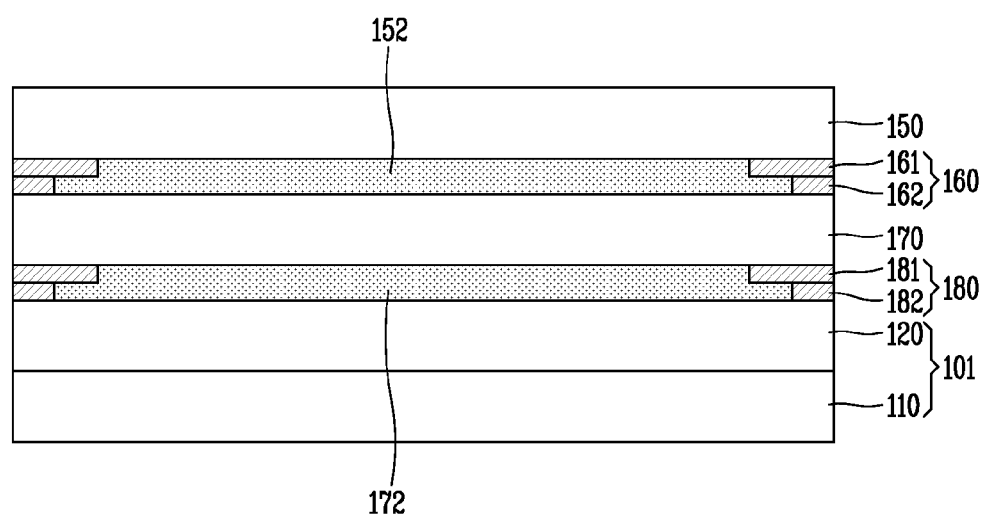
FIG. 5 is a cross-sectional view illustrating a structure of a display device according to another embodiment of the present disclosure.

FIG. 5 is a view illustrating a structure of a display device according to another embodiment of the present disclosure.

As illustrated in FIG. 5, the display device according to the present embodiment includes a display panel 101 displaying an image, a functional panel 170 attached to the display panel 101, and a cover glass substrate 150 attached to the functional panel 170.

The display panel 101 is a flat display panel and may include various display panels such as a liquid crystal display panel, an organic light emitting display panel, an electrophoretic display panel, and the like. The display panel 101 includes a first substrate 110 and a second substrate 120, which are similar to the first substrate 10 and the second substrate 20, respectively, described in conjunction with FIG. 1. The functional panel 170 may include various panels such as a 3D FPR or a parallel barrier panel for implementing a stereoscopic image, a touch panel facilitating input of information, and the like.

The functional panel 170 and the cover glass substrate 150 are attached to the display panel 101 and the functional panel 170 by a first adhesive layer 172 and a second adhesive layer 152 formed of a transparent resin adhesive such as an optically clear resin (OCR) or an optically clear adhesive (OCA), respectively.

Meanwhile, the cover glass substrate 150 is also a type of functional panel for protecting the display panel 101. Thus, in the above, although the cover glass substrate 150 and the functional panel 170 are separately described, the cover glass substrate 150 may also be described as a functional panel 170 such as a cover panel.

In this case, print layers 160 and 180 may respectively be formed on the functional panel 170 and the cover glass substrate 150 to block light leakage through outer regions of the functional panel 170 and the cover glass substrate 150 when the functional panel 170 and the cover glass substrate 150 are attached to the display panel 101.

The print layer 180 for a functional panel includes a first print layer 181 and a second print layer 182 formed on the first print layer 181. Although not shown in the drawing, a plurality of bubble outlets may be formed along the width of the second print layer 182 to outwardly discharge bubbles included in the adhesive layer 172 on the first print layer 181 during a deaerating process. In this case, the bubble outlets may be formed to have a structure identical to that illustrated in FIGS. 3A and 3B.

The print layer 160 for a cover glass substrate 150 includes a first print layer 161 and a second print layer 162 formed on the first print layer 161. Although not shown in the drawing, a plurality of bubble outlets may be formed along the width of the second print layer 162 to outwardly discharge bubbles included in the adhesive layer 152 on the first print layer 161 during a deaerating process.

In this manner, in the present embodiment, when various functional panels 170, as well as a cover glass substrate 150, are attached to the display panel 101, two print layers 160 and 180 are formed on the cover glass substrate 150 or the functional panel 170 to which an adhesive is applied, and a plurality of bubble outlets are formed to penetrate an outer surface of the print layer 160 or 180 along the width of the print layer 160 or 180, whereby bubbles generated when an adhesive is applied may be efficiently removed, thus preventing defects due to bubbles.

Meanwhile, in the above description and drawings, only the structure in which the cover glass substrate 150 is attached to the display panel 101 and the structure in which the functional panel 170 and the cover glass substrate 150 are attached to the display panel 101 are disclosed, but the display device 101 according to the embodiment of the present disclosure is not limited thereto. For example, a functional panel 170 such as a 3D FPR or a parallax barrier panel may be attached to the display panel 101 and a functional panel 170 such as a touch panel may be attached thereto, and also, a cover glass substrate 150 may be attached thereto. In other words, in the embodiment of the present disclosure, various functional panels may be attached to the display panel 101, and a plurality of print layers such as 160 and 180 for including an adhesive when the functional panels 170 are attached are formed, and a plurality of outlets for removing bubbles included in the adhesive may be formed in the print layers 160 and 180.

In other words, in the embodiment of the present disclosure, any structure may be implemented as long as an adhesive is used to attach various functional panels 170 to the display panel 101 and outlets for discharging bubbles are formed in the print layers 160 or 180 including the adhesive in order to remove bubbles included in the adhesive. Namely, the present disclosure may be applied to display panels 101 and functional panels 170 having various structures.

The foregoing embodiments and advantages are merely and are not to be considered as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the embodiments described herein may be combined in various ways to obtain additional and/or alternative embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds are therefore intended to be embraced by the appended claims.

What is claimed is:

1. A display device comprising:
a display panel for displaying an image;
at least one panel attached to the display panel;
an adhesive layer between the display panel and the at least one panel to attach the at least one panel to the display panel;
a plurality of print layers around an outer circumferential surface of the at least one panel, the plurality of print layers including a first print layer and a second print layer,
wherein the second print layer includes a plurality of bubble outlets having a width narrower than a width between adjacent bubble outlets of the plurality of bubble outlets.

2. The display device of claim 1,
wherein the first print layer is disposed around the outer circumference of the at least one panel, and
wherein the second print layer is disposed around an outer circumference of the first print layer.

3. The display device of claim 2, wherein the plurality of bubble outlets are configured to discharge bubbles included in the adhesive layer on the first print layer.

4. The display device of claim 1, wherein the plurality of print layers are formed of a black resin to block light transmitted through a corresponding region.

5. The display device of claim 1, wherein the plurality of print layers are formed of a color resin to show a corresponding region with a corresponding color.

6. The display device of claim 1, wherein the adhesive layer is formed of an optically clear resin (OCR) or an optically clear adhesive (OCA).

7. The display device of claim 1, wherein the at least one panel includes a cover substrate.

8. The display device of claim 7, wherein the cover substrate is formed of glass or plastic.

9. The display device of claim 1, wherein the at least one panel includes a functional panel.

10. The display device of claim 9, wherein the functional panel includes a three-dimensional (3D) film patterned retarder (FPR), a parallax barrier panel, and a touch panel.

11. The display device of claim 1, wherein the at least one panel comprises:
a cover substrate; and
a functional panel.

12. The display device of claim 11, further comprising:
a second adhesive layer attaching the cover substrate and the functional panel; and
a second plurality of print layers in an outer circumferential region between the cover substrate and the functional panel, at least one of the second plurality of print layers including a second plurality of bubble outlets.

13. The display device of claim 1, wherein the bubble outlets are sized to discharge bubbles included in the adhesive layer during a deaerating process, and wherein the bubble outlets are sized to not discharge adhesive included in the adhesive layer during the deaerating process.

14. The display device of claim 1, wherein a first width between an inner edge of the first print layer and an outer edge of the at least one panel is greater than a second width between an inner edge of the second print layer and the outer edge of the at least one panel.

15. The display device of claim 1, wherein the plurality of bubble outlets are shaped as concave recesses opening toward the display panel.

* * * * *